Figure 1:
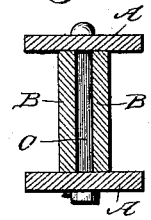

(No Model.) 2 Sheets—Sheet 1.

W. M. POINDEXTER.
COMPOSITE COLUMN OR OTHER STRUCTURAL SUPPORT.

No. 588,290. Patented Aug. 17, 1897.

Witnesses:
Herbert Bradley
Fred R. Proctor

Inventor:
William M. Poindexter
By Knight Bros
Att'ys.

(No Model.) 2 Sheets—Sheet 2.

W. M. POINDEXTER.
COMPOSITE COLUMN OR OTHER STRUCTURAL SUPPORT.

No. 588,290. Patented Aug. 17, 1897.

Witnesses:
Herbert Bradley
Fred R. Proctor

Inventor
William M. Poindexter
By Knight Bros.
Attys

United States Patent Office.

WILLIAM M. POINDEXTER, OF WASHINGTON, DISTRICT OF COLUMBIA.

COMPOSITE COLUMN OR OTHER STRUCTURAL SUPPORT.

SPECIFICATION forming part of Letters Patent No. 588,290, dated August 17, 1897.

Application filed October 15, 1896. Serial No. 608,989. (No model.)

*To all whom it may concern:*

Be it known that I, WILLIAM M. POINDEXTER, a citizen of the United States, and a resident of Washington, in the District of Columbia, have invented certain new and useful Improvements in Composite Columns or other Like Structural Supports, of which the following is a specification.

The object of my invention is to devise a cheap, strong, and simple composite column or other composite structural support, strut-tie, or brace, and one which can be readily made from material to be found at any time in the market, it being intended that the improved structure shall be adapted for manipulation, use, or association with other common forms or elements of this character equally as well as plain columns or other composite columns now in use.

In its simplest form my invention comprises a pair of outer members, which may be of almost any desired section, and one or more, preferably a pair, of interposed spacing and bracing members which are held in place and the whole structure made rigid by through-bolts which pass from one outer member to the other and draw said outer members firmly toward each other to cause them to impinge upon the interposed members and fix the latter in place by the simple pressure which is upon them.

My invention is susceptible of very wide application and modification, the forms of embodiment varying according to the combinations which may be made between the various forms or sections of bars, beams, &c., to be found in the market and which are employed in making up composite structures embodying the principle of my invention.

My invention will be fully understood upon reference to the accompanying drawings, which illustrate some of the various embodiments thereof, as will be seen from Figures 1 to 13, inclusive, and some of the common uses for columns, &c., and for which my invention is well adapted, as disclosed by Figs. 14 to 19.

In the several figures, A represents the pair of outer members, and B the interposed spacing and bracing members, while C represents the through bolts or rivets or other connecting means equivalent thereto. In all the forms it will be seen that the bolts C pass entirely through the two outer members and draw them together or toward each other, and that the interposed member or members are held in place principally by the pressure thus imposed upon them.

In Fig. 1 is shown the simplest embodiment of the invention, which comprises a pair of plain bars for the outer members and a pair of similar bars for the interposed members, the interposed members being made to abut against and being spaced apart by the through-bolts C.

Figure 2:
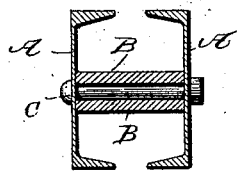
Figure 3:
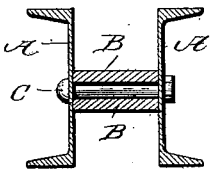
Figure 4:
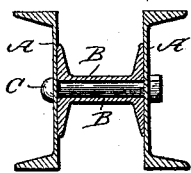

Figs. 2 and 3 illustrate slightly-modified structures wherein ordinary channel-irons are employed for the outer member, the flanges being turned out and in in the respective figures. These forms have the advantages of offering additional stiffness to the structure and of strengthening the outer edges in the same direction in which the interposed members strengthen the webs of the channel-iron.

In Figs. 4, 5, 6, and 7 are illustrated the use of channel-iron as the interposed members and having their flat faces abutting the through-bolts, so that their flanges extend outwardly and increase the bearing against the outer members and maintain the parallelism of said parts, while adding stiffness to the structure as a whole. These views, Figs. 4 to 7, illustrate what for most purposes would be regarded as the preferred form.

Figure 8:
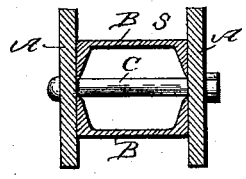
Figure 9:
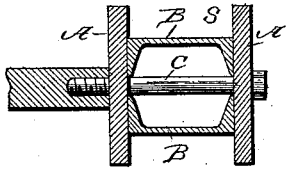
Figure 5:
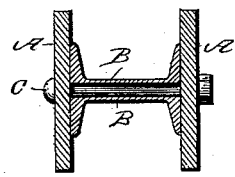
Figure 11:
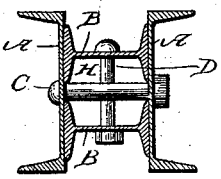
Figure 10:
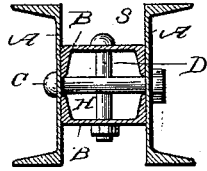
Figure 6:
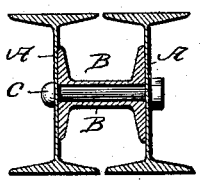
Figure 7:
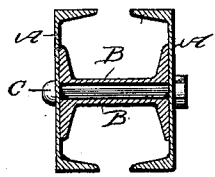
Figure 12:
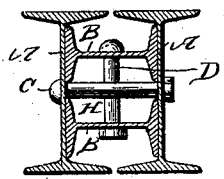
Figure 13:
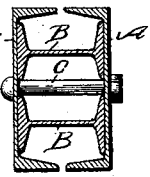

Figs. 8, 9, and 10 illustrate forms made up of substantially the same material as that employed in Figs. 4 to 7, but in which the interposed members are reversed. This construction has special advantages when used in some connections. For instance, the space S makes a channel for the reception of timbers or for other parts which may be introduced, and the housing H, which is formed within the interposed members, may also be useful for many purposes. The web of the channel-iron offers facility for bolting by passing the bolts through the web and through a part or object which it is desired to support upon the column or support thus formed. Substantially the same principle is involved in Fig. 11, and these figures, together with Figs. 12 and 13, all embrace the feature of making a box-shaped structure which offers increased strength. In those forms wherein the interposed members are made of I-beams the additional feature of increased bearing on both sides of the web is secured. If the outer members be also made of I beams or bars, the structure is still further strengthened by the abutment of the flanges on the two sets of members, which prevents possible displacement. In several of these forms is shown the idea of additional locking-bolts D for preventing possibility of displacement of the interposed members in case the load to be borne or other circumstances make this necessary, such bolts passing through the pair of interposed members and drawing them tightly together upon the main through-bolts of the structure, which space said interposed members apart.

One advantage of my invention in addition to those already enumerated is the great saving in number of securing-bolts required, as well as the saving in labor consequent upon the reduction of the number of bolts.

In all the forms illustrated the same principle is embodied—namely, the interposing of two members at right angles to the flat faces of the outer members and coextending in length and holding the structure together by a single line of through-bolts parallel to the interposed members and not intersecting the same, whereby the axis of the structure is established in the plane of the line of bolts and the strain uniformly distributed over the whole structure. In all forms the interposed members have squared bearing-faces. In many cases it will be found desirable to employ flanged bars for the interposed members in order to increase the area of the bearing-faces, and these flanged members may be either doubly flanged, as in the case of ordinary I-beams, or flanged on one side only, as in the case of ordinary channel-iron. In a like manner the outer members may be doubly or singly flanged, as may be dictated by the requirements of the use to which the article is to be put.

Figure 18:
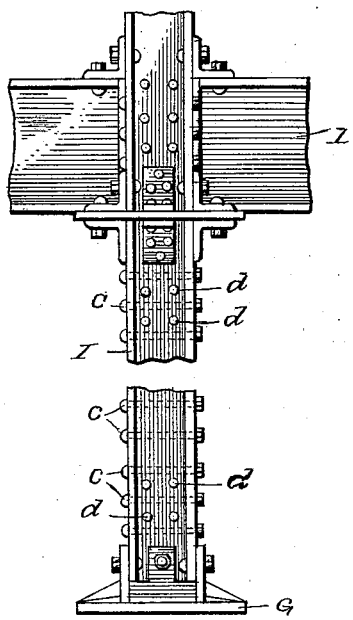
Figure 15:
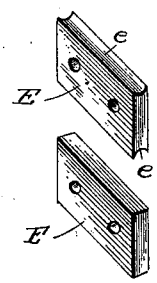
Figure 14:
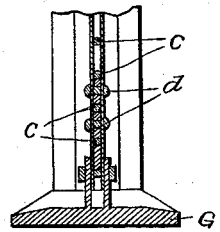

From Figs. 14, 15, and 18 will be seen the preferred manner of stiffening and adding body to the ends of the structure or at any intermediate point requiring reinforcement.

E represents a filling-block which has grooved or flat sides e and is of such width as to fill in solidly one or more of the spaces between adjacent through bolts or rivets c, which come in close contact with the grooved or flat edges of the said filling-blocks. The bolts or rivets c and d, when in place, in combination with the filling-plates E, offer a firm resistance to any vertical or lateral movement of the interposed bracing and spacing members B, thus securing great rigidity and strength to the points of column so reinforced.

Figure 17:
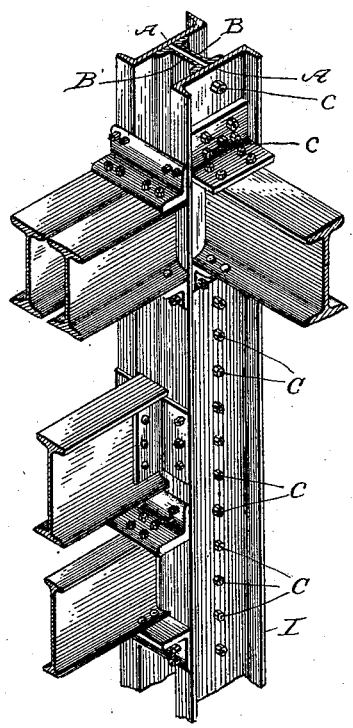
Figure 19:
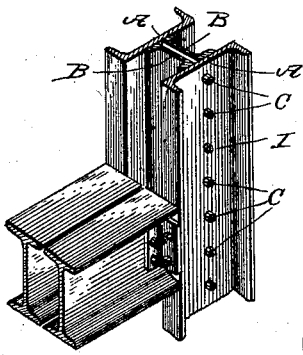
Figure 16:
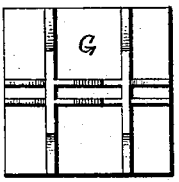

In using the structure constructed in accordance with my invention, used as a column or support, it may be set upon any common form of bearing-plate or a base-casting G, as shown in Fig. 16. The adaptation of the columns to the usual and prevailing methods of connecting to and supporting beams and girders is illustrated by Figs. 17, 18, and 19.

Having thus described my invention, the following is what I claim as new therein and desire to secure by Letters Patent:

1. A composite column, or other structural support comprising a pair of outer members having flat inner faces, a pair of spacing and strengthening members interposed at right angles to the flat faces of the outer members and within the outer edges of the latter, and an axial series of bolts passed through the outer members and between and not intersecting the interposed members, and drawing or binding the outer members tightly upon the interposed members and thereby holding them in place and making a rigid structure of the whole, substantially as herein explained.

2. A composite column or other structural support comprising a pair of outer members having flat inner faces, a pair of spacing and bracing members interposed at right angles to said flat faces, an axial series of bolts passing through the outer members and between the interposed members without intersecting the latter and spacing them apart, and drawing the outer members tightly upon the interposed members to impose sufficient pressure to hold the latter in place and make a rigid structure of the whole, as herein explained.

3. A composite column or other structural support comprising a pair of outer members having flat inner faces, a pair of spacing and bracing members interposed at right angles to the said flat faces and having flanges to increase their bearing thereon, and an axial series of bolts passing through the outer members and parallel to but not intersecting the interposed members and drawing the former tightly upon the latter to form a rigid braced structure of the whole, as explained.

4. In a composite column, or other structural support, the combination of the flanged outer members, and the flanged interposed spacing and bracing members, an axial series of through-bolts which draw the outer members firmly together upon the interposed members, the interposed members being symmetrically arranged on opposite sides of, and spaced apart by the said bolts, substantially as and for the purposes herein set forth.

5. A composite column, or other structural support comprising the pair of outer members, and the pair of interposed spacing and bracing members, through-bolts which draw the outer members together upon the interposed members; said interposed members being formed of channel-irons, and being arranged with their flat faces opposed and resting against the securing-bolts and spaced apart thereby and with their flanges abutting the outer members and increasing the bearings between the parts to maintain the parallelism of the said outer members and brace the whole structure, substantially as herein explained.

6. A composite column or other structural support, comprising the outer members and the interposed spacing and bracing members, the whole being secured together by through-bolts drawing the outer members together upon the interposed members, and the filling pieces or blocks inserted between the interposed members, and secured by bolts passing through them, as explained.

7. A composite column, or other structural support, comprising the pair of outer members, the pair of interposed members, the through-bolts drawing the outer members together upon and thus securing the interposed members, and the filling-blocks inserted between the interposed members and secured by the short bolts passing through the blocks and said members; the interposed members being made to abut against the through-bolts, and being spaced apart thereby, as explained.

8. A composite column, or other structural support, comprising the pair of outer members and the pair of interposed spacing and bracing members, an axial series of through-bolts which draw the outer members together upon the interposed members to secure them in place and make the structure solid; and the interposed members abutting against the through-bolts and spaced apart thereby, and the said interposed members being additionally spaced and braced by the inserted blocks of thickness equal to the diameter of the through-bolts, which blocks have their edges fitting up closely to the through-bolts, and short transverse bolts passing through the blocks and the said interposed members, which when in place firmly bind the whole structure together, substantially as herein explained.

W. M. POINDEXTER.

In presence of—
HELEN E. PARKER,
HERVEY S. KNIGHT.